(12) United States Patent
Shanmugasundaram et al.

(10) Patent No.: US 7,016,915 B2
(45) Date of Patent: Mar. 21, 2006

(54) METHOD FOR PROCESSING XML QUERIES OVER RELATIONAL DATA AND META-DATA USING A RELATIONAL DATABASE SYSTEM

(75) Inventors: Jayavel Shanmugasundaram, Ithaca, NY (US); Eugene Jon Shekita, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 10/331,740

(22) Filed: Dec. 28, 2002

(65) Prior Publication Data
US 2004/0128306 A1  Jul. 1, 2004

(51) Int. Cl.
*G06F 17/30* (2006.01)
(52) U.S. Cl. ..................................... 707/102
(58) Field of Classification Search ............... 707/1–10, 707/100–104.1, 200–205; 715/513
See application file for complete search history.

(56) References Cited

U.S. PATENT DOCUMENTS

| | | | |
|---|---|---|---|
| 6,336,124 B1 | 1/2002 | Alam et al. | |
| 6,356,920 B1 | 3/2002 | Vanderluis | |
| 6,604,100 B1 * | 8/2003 | Fernandez et al. ............ | 707/3 |
| 2002/0123993 A1 * | 9/2002 | Chau et al. .................... | 707/5 |
| 2003/0014397 A1 * | 1/2003 | Chau et al. .................... | 707/3 |

FOREIGN PATENT DOCUMENTS

| | | |
|---|---|---|
| JP | 2001 034619 A | 2/2001 |
| JP | 2001 256102 A | 9/2001 |
| WO | WO 00/75849 A2 | 12/2000 |
| WO | WO 01/93111 A2 | 12/2001 |
| WO | WO 02/03245 A1 | 1/2002 |

OTHER PUBLICATIONS

Xin Zhang et al., "Honey, I shrunk the Xquery!: an XML algebra optimization appoarch", Nov. 2002, ACM Press, pp. 15-22 in Workshop on Web Information and Data Management Proceedings of the 4th Intern'l workshop on web information.*

Onizuka et al., "Incremental maintenance for materialized XPath/XSLT views", May 2005, ACM Press, pp. 672-681.*

Jayavel Shanmugasundaram et al, "A general technique for querying XMK documents using a relational database system", Sep. 2001, ACM Press, vol. 30, Issue 3, pp. 20-26.*

Schaefer et al., "Performance Path Method and Apparatus for Exchanging Data Among Systems using Different Data Formats." United States Patent Application, Jan. 24, 2002, U.S. Appl. No. 09/741,008.

Gorelik et al., "Nested Relational Data Model." United States Patent Application, Nov. 29, 2001, U.S. Appl. No. 09/782,186.

(Continued)

*Primary Examiner*—Diane Mizrahi
(74) *Attorney, Agent, or Firm*—Marc D. McSwain (57) ABSTRACT

A system, method, and computer program product for processing XML queries over relational data and meta-data using a relational database system. The invention runs a query to generate a view definition, so a regular query processor can handle queries on a mix of data and meta-data. Names of desired tables are data-dependent, so the invention represents a default XML view as an XML query over the relational tables, gets the table names and table data by recursively invoking the query processor (first by querying the catalog table, and then querying base data according to a new construct). The invention thus processes queries over table names in addition to table values.

19 Claims, 5 Drawing Sheets

OTHER PUBLICATIONS

Huang et al., "JSIM database: a Web-based database application using XML." Proceedings of 38th Annual ACM Southeast Conference, Clemson S.C., Apr. 7-8, 2000, pp. 171-178.

Shanmugasundaram et al., "Efficiently Publishing Relational Data as XML Documents," Proceedings of the 26th International Conf. on VLD, Cairo Egypt, 2000, pp. 65-76.

Fernandez et al., "Efficient Evaluation of XML Middle-ware Queries," ACM SIGMOD, Santa Barabara, CA. USA, May 21-24, 2001, pp. 103-114.

Fong et al., "Converting Relational Database into XML Document," 12th Annual Workshop on Database and Expert Syst. Appl., Munich Germany, Sep. 3-7, 2001, IEEE 2001, pp. 61-65.

Lin et al., "Object-Oriented Mediator Queries to XML Data," IEEE May 2000, pp. 39-46.

Bourret et al., "A Generic Load/Extract Utility for Data Transfer Between XML Documents and Relational Databases," Proc. of the 2nd International workshop on WECWIS Milpitas CA. USA, Jun. 2000, IEEE 2000, pp. 134-143.

Deutsch et al., "XML-QL: A Query Language for XML," Proc. of the Eighth Intl. World Wide Web Conf. Toronto, Ontario, Canada, May 1999., Computer Networks, vol. 31, No. 11-16, pp. 1155-1169.

Eugene Xavier P., "Using Extensible Query Language (XQL) for Database Applications," Proc. of Eighth Annual IEEE Intl. Conf. and Workshop on ECBS '01, Washington D.C. USA, Apr. 17-20, 2001, pp. 2-9.

Varlamis et al., "Bridging XML-Schema and relational databases. A system for generating and manipulating relational databases using valid XML documents," Proceedings of the ACM Conference on Document Engineering, Atlanta, GA USA., Nov. 9-10, 2001, pp. 105-114.

Shanmugasundaram et al., "Querying XML Views of Relational Data," Proceedings of the 27th VLDB Conference, Rome Italy, Sep. 11-14, 2001. pp. 261-270.

* cited by examiner

FIG. 1 category

| catname | ptype |
|---|---|
| electronic | resistor |
| electronic | capacitor |
| test equip. | voltmeter | resistor

| sno | ohms | cost |
|---|---|---|
| 1270 | 100 | 3.25 |
| 1763 | 500 | 4.75 | capacitor

| sno | farads | cost |
|---|---|---|
| 4671 | 5mf | 2.23 |
| 4433 | 4mf | 5.40 | voltmeter

| sno | type | cost |
|---|---|---|
| 3272 | analog | 22.00 |
| 3733 | digital | 85.75 |

FIG. 2

```
<db>
<category>
<row> <catname> electronic </catname> <ptype> resistor </ptype> </row>
<row> <catname> electronic </catname> <ptype> capacitor </ptype> </row>
<row> <catname> test equip. </catname> <ptype> volt meter </ptype> </row>
</category>
<resistor>
<row> <sno> 1270 </sno> <ohms> 100 </ohms> <cost> 3.25 </cost> </row>
<row> <sno> 1763 </sno> <ohms> 500 </ohms> <cost> 4.75 </cost> </row>
</resistor>
<capacitor>
<row> <sno> 4671 </sno> <farads> 5mf </farads> <cost> 2.23 </cost> </row>
<row> <sno> 4433 </sno> <farads> 4mf </farads> <cost> 5.40 </cost> </row>
</capacitor>
...
</db>
```

```
<part type="resistor"> <sno> 1270 </sno> <ohms> 100 </ohms> <cost> 3.25 </cost> </part>
<part type="resistor"> <sno> 1763 </sno> <ohms> 500 </ohms> <cost> 4.75 </cost> </part>
<part type="capacitor"> <sno> 4671 </sno> <farads> 5mf </farads> <cost> 2.23 </cost> </part>
<part type="capacitor"> <sno> 4433 </sno> <farads> 4mf </farads> <cost> 5.40 </cost> </part>
```

FIG. 3

```
1.  for $catrow in view("default")/category/row
2.      $table in view("default")/*
3.      $part in $table/row
4.  where $catrow/catname = "electronic" and
5.        $table/tagname() = $catrow/ptype
6.  return
7.      <part type=$category/ptype> $part/* </part>
```

1. select tabname, colname
2. from category c, SYSCAT.COLUMNS s
3. where c.catname = "electronic" and c.ptype = s.tabname
4. order by tabname

FIG. 8

1. select 0, "resistor", sno, ohms, cost, null, null, null
2. from resistor
3. union all
4. select 1, "capacitor", null, null, null, sno, farads, cost
5. from capacitor

METHOD FOR PROCESSING XML QUERIES OVER RELATIONAL DATA AND META-DATA USING A RELATIONAL DATABASE SYSTEM

FIELD OF THE INVENTION

This invention relates to using a relational database system to process XML queries, and more specifically to a method for generating SQL queries from XML queries that have references to both relational data and meta-data.

CROSS-REFERENCE TO RELATED APPLICATIONS

This invention is related to two commonly-owned pending U.S. patent applications, each of which is hereby incorporated by reference, including:

U.S. Ser. No. 10/234,876 "System, Method, and Computer Program Product For Querying XML Documents Using A Relational Database System", filed Aug. 30, 2002, and U.S. Ser. No. 09/810,167 "Tagging XML Query Results Over Relational DBMSs", filed Mar. 19, 2001.

BACKGROUND OF THE INVENTION

XML has emerged as the dominant standard for exchanging business data over the Internet. Existing relational data must therefore be published as XML. An XML query processor can be used to publish relational data as XML; the XML query processor sits as a translation layer on top of a relational database, providing a default XML view of the underlying relational schema. Users can write XML queries over the default XML view to publish relational data as XML. The XML queries are translated to SQL queries, which are executed in the relational engine.

The underlying relational schema is often designed independently of the XML publishing requirements. Therefore, relational meta-data (schema information) must often be treated as though it is data (and vice-versa) when publishing XML documents. In other words, an XML query over the default XML view may need to query both over relational data and meta-data. Unfortunately, the underlying relational database system cannot support such queries because the SQL query language used in relational database systems, which is based on first-order logic, cannot query seamlessly across both relational data and meta-data.

Some work on higher-order query languages is known in the art. For example, SchemaSQL is essentially a higher-order extension to SQL. Techniques for implementing SchemaSQL on top of a relational database system have been described in L. Lakshmanan et al. "SchemaSQL—A Language for Querying and Restructuring Multidatabase Systems", Proceedings of the VLDB Conference, Bombay, India, September 1996 and L. Laskshmanan et al. "On Efficiently Implementing SchemaSQL on an SQL Database System", Proceedings of the VLDB Conference, Edinburgh, Scotland, September 1999.

Microsoft's OLEDB provides a way to describe the result "shape" of a query that is being executed by a remote data source. See "Microsoft OLEDB 2.0 Programmer's Reference and Software Development Kit", Microsoft Press, November 1998. However, OLEDB is only for processing SQL queries, not XML queries. Moreover, in OLEDB, an execution plan (i.e., internal representation) of the query is not provided by the remote data source, which makes it impossible to do some kinds of optimizations. For example, the internal representation of a remote query cannot be grafted onto the internal representation of a local query. This makes it impossible to globally optimize the combined local/remote query before executing it.

A method of efficiently executing "higher-order" XML queries that span relational data and meta-data is therefore needed. If meta-data query processing could be tightly integrated with regular query processing over relational data, then a large part of the computation of queries over relational data and meta-data could be pushed down to the relational database engine.

SUMMARY OF THE INVENTION

It is accordingly an object of this invention to provide a method, system, and program product for generating SQL queries from XML queries that have references to both relational data and meta-data. The approach described handles the full generality of an XML query language for querying relational data and meta-data, rather than relying on proprietary SQL extensions. In addition, the method enables use of the same query-processing infrastructure for optimizing and executing both regular and meta-data parts of the query.

The invention parses an input XML query over a default XML view into an internal representation that captures the semantics of the query, then replaces all non-meta-data references to the default XML view by direct references to tables. All meta-data references to the default XML view are then replaced with a reference to the internal representation of the default XML view over the relational catalog tables. This internal representation can be optimized, and will include a higher-order operator (termed ExecXQuery) that when executed produces the result of a separate sub-query for each table in the relational database.

The query processor can be recursively invoked on the input to ExecXQuery, to execute the internal representation below ExecXQuery to produce one or more query strings, with each string corresponding to a query that will construct the default XML view of a given relational table. The input query strings are parsed and converted to their internal representation, unioned together, and then grafted on the result in place of ExecXQuery. After all ExecQuery references have been eliminated, the resulting internal representation is processed like a regular XML query without any meta-data references, and the XML result is returned to the user.

The foregoing objects are believed to be satisfied by the embodiment of the present invention as described below.

DETAILED DESCRIPTION OF THE INVENTION

Figure 1:
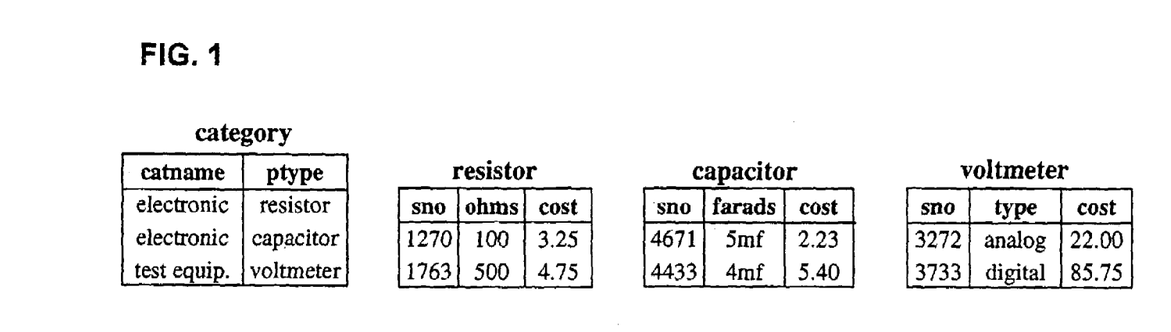
FIG. 1 is a diagram of an example relational schema, according to an embodiment of the present invention.

Referring now to FIG. 1, a diagram of an example relational schema is shown, according to an embodiment of the present invention. Suppose that an industrial parts supplier database that has the relational schema of FIG. 1 contains tables that store information about three types of parts: resistors, capacitors, and voltmeters. These are stored in separate tables because parts can have different attributes depending on their type. For example, resistors have the "Ohms" attribute while capacitors have the "Farads" attribute. In addition to the parts tables, there is also a category table that specifies the category of each part type. In our example, the resistor and capacitor part types appear under the "electronic" category, while the voltmeter part type appears under the "test equipment" category.

Figure 2:
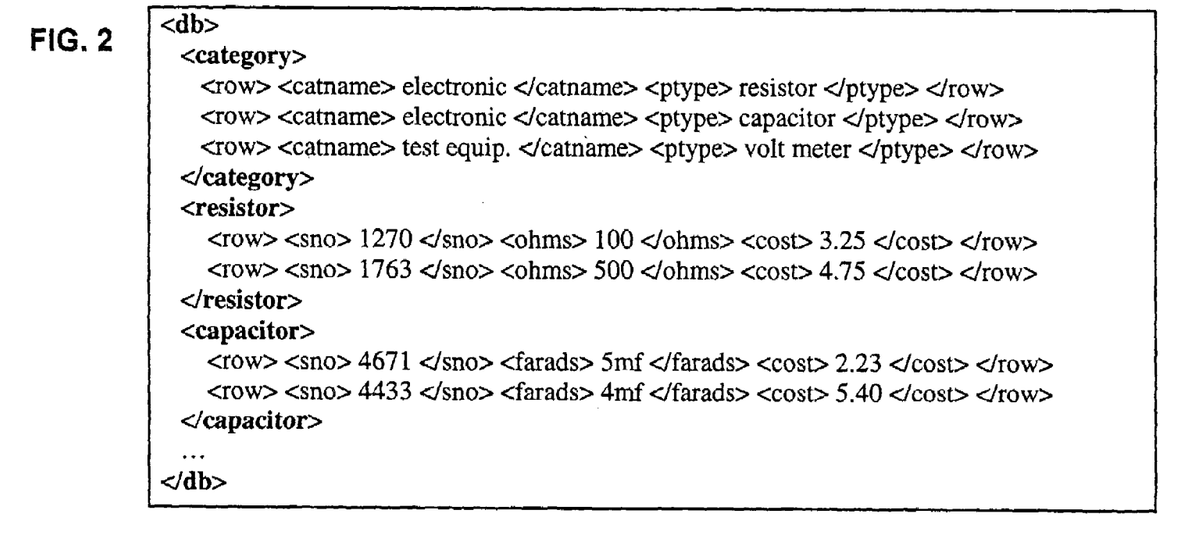
FIG. 2 is a diagram of a default XML view, according to an embodiment of the present invention.

Referring now to FIG. 2, a diagram of a default XML view is shown, according to an embodiment of the present invention. The default view corresponds to the relational schema shown in FIG. 1.

Figure 3:
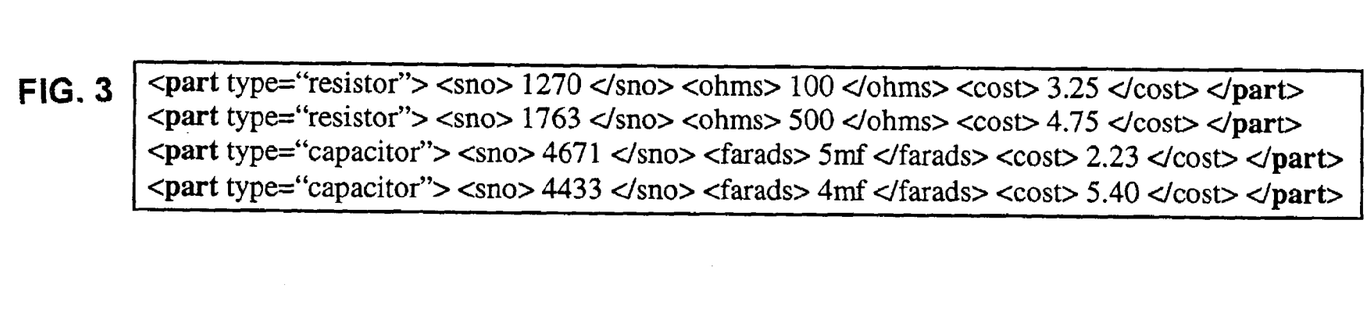
FIG. 3 is a diagram of an XML document to be published, according to an embodiment of the present invention.

Referring now to FIG. 3, a diagram of an XML document to be published is shown, according to an embodiment of the present invention. Consider the case where the parts supplier wants to publish information about "electronic" parts, using the XML format shown in FIG. 3. Each "part" element has an attribute that specifies its type. Type-specific information is nested as sub-elements. Users can achieve the publishing task by creating a user-defined view over the default XML view of the parts database, and then writing an XML query over the default view (shown in FIG. 2).

Figure 4:
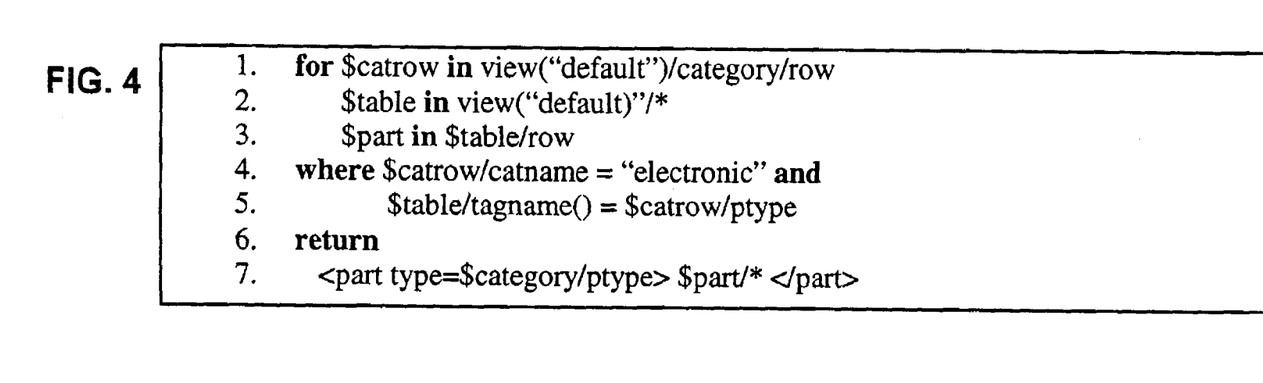
FIG. 4 is a diagram of a query to publish an XML document, according to an embodiment of the present invention.

Referring now to FIG. 4, a diagram of a query to publish an XML document is shown, according to an embodiment of the present invention. Specifically, FIG. 4 shows an XQuery over the default view of FIG. 2 to publish the desired XML document of FIG. 3. The query works as follows. It first binds $catrow to all the "row" elements nested under the category "table" element in the default view (line 1). It then selects only those $catrow elements that correspond to the "electronic" category (line 4), to determine the part types that belong to the "electronic" category. The query then binds $table to the "table" elements in the default XML view that correspond to "electronic" part types (resistor and capacitor). This is done by first getting all the table elements (line 2—note that /* gets all sub-elements), and then selecting those table elements that have the same tag name as one of the "electronic" part types (line 5). Once $table is bound to each electronic "table" element, all its "part" elements are determined (line 3) and the desired XML result is returned (lines 6 and 7).

It is important to note that while users can write such queries over the default XML view, SQL systems cannot directly support them. To see why this is the case, consider what a corresponding SQL query (to fetch all parts in the "electronic" category) would have to do. First, the SQL query would have to select from the category table to determine "electronic" part types. The resulting part types (resistor and capacitor) would be the names of the tables that belong to the "electronic" category. These dynamically determined tables would then have to be queried to get the actual parts. This presents a problem for SQL because table names in a SQL statement cannot be derived from data values, i.e., they cannot be the result of sub-queries. Thus, in our example, there is no way a single SQL query can determine the name of tables containing "electronic" parts and then query those tables.

We now present a technique for handling such "higher-order" queries. This technique is different from other solutions to this problem, which require application developers to either (a) use nonstandard, non-XML query languages (such as SchemaSQL) for this purpose, or (b) write application programs that first issue a query to determine the desired table names, and then generate another query to retrieve the desired data items. The latter approach effectively moves part of query optimization into the hands of application developers, since a non-declarative program has to be written. We now describe how meta-data processing can be tightly integrated with the regular query processor, thereby enabling computation to be pushed down for both data and meta-data queries.

Figure 5:
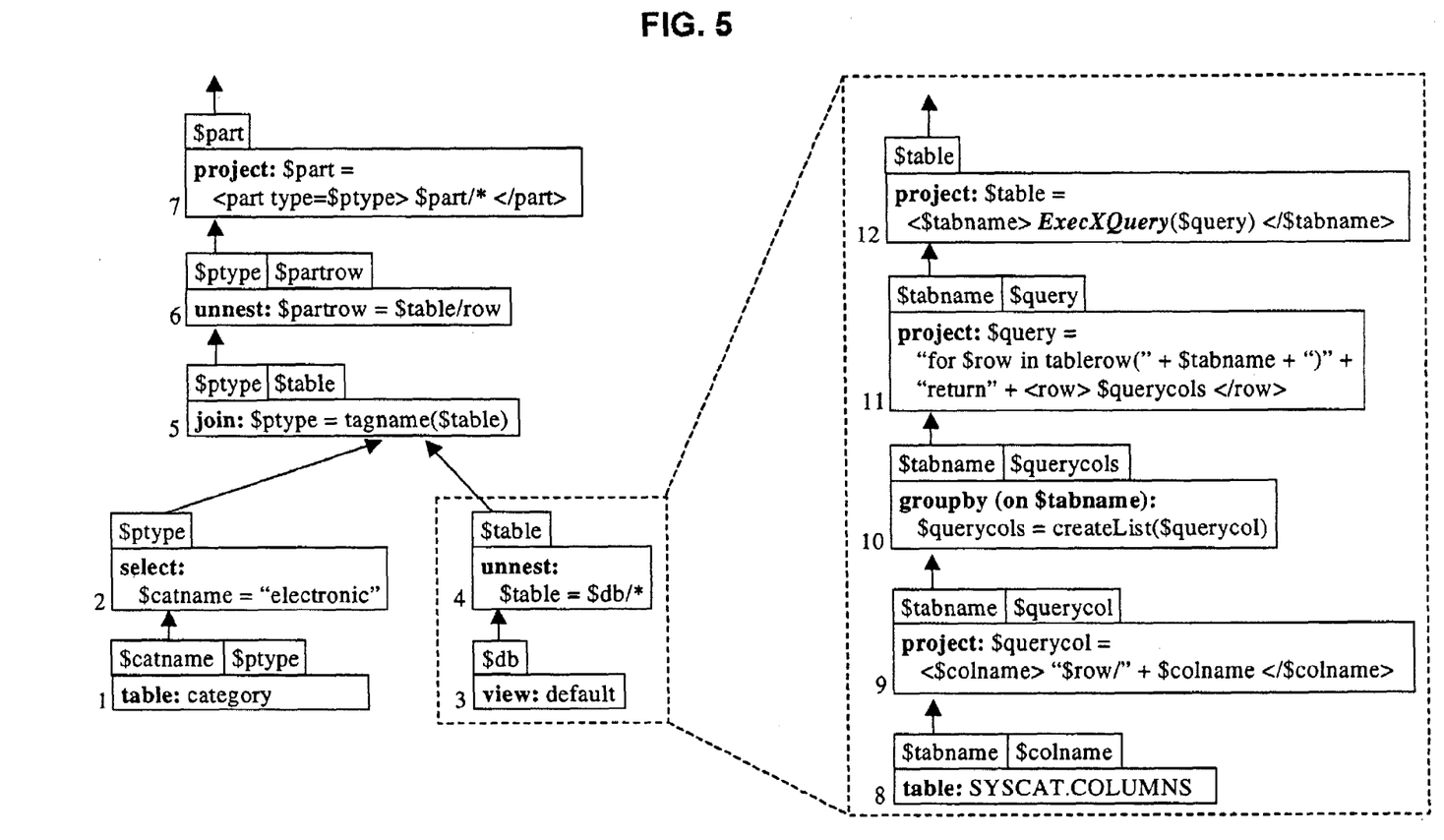
FIG. 5 is a diagram of an internal representation for a meta-data query and a default XML view, according to an embodiment of the present invention.

Referring now to FIG. 5, a diagram of an internal representation for a meta-data query and a default XML view is shown, according to an embodiment of the present invention. An internal representation for the query of FIG. 4 is shown in FIG. 5 (left side). The internal representation is meant to capture the semantics of the query. Different internal representations are possible. The internal representation shown in FIG. 5 is referred to as the XML Query Graph Model (XQGM), since it graphically models XML queries.

XQGM consists of a set of operators that capture the semantics of an XML query. Most of the operators mirror those of traditional relational operators. There are "select", "project", "join", "group by", and "union" operators that have the same semantics as their relational counterparts. There are also "table" and "view" operators, which are used to refer to relational tables and XML view definitions respectively. Finally, there is an "unnest" operator, which is used to unnest XML lists.

In FIG. 5, the numbered boxes correspond to operators. For example, box 5 corresponds to a join operator. Each operator outputs a tuple stream. The type of a tuple column is a simple type (like an integer), an XML element, or a list of XML elements. For example, the output tuple stream of box 5 has two columns, $ptype and $table. The $ptype column has type integer, while the $table column has type XML element.

As shown in FIG. 5, "electronic" part types are first determined by performing a selection on the category table (boxes 1 and 2). These are joined with the tag names of "table" elements in the default view (box 5). The desired "part row" elements are then unnested from their "table" element (box 6), and used to produce the result (box 7).

The key feature to note in FIG. 5 is that the reference to the default view (box 3) cannot be directly replaced with references to the appropriate relational tables, as is done for the category table in box 1. This is because the names of the desired tables are data-dependent (result of the join in box 5) and not known at query compile time. The solution is to represent the default XML view itself as an XML query over the relational catalog tables (which capture schema information). This approach has the following two advantages. Firstly, it allows the same infrastructure to be used for processing both regular and meta-data queries. Secondly, it also enables a large part of the computation for meta-data queries to be pushed down to the relational engine.

Representing the Default XML View as an XML Query

The right side of FIG. 5 shows the XQGM corresponding to the XML query that defines the default XML view. This corresponds to an expansion of boxes 3 and 4. At a high level, the operation corresponding to box 11 produces an XML Query for each table in the relational database. Each of these queries, if executed, materializes the "row" elements in the default view for the corresponding table. The top operation in the XQGM representation (box 12) invokes a higher-order function called ExecXQuery to produce the result of executing each such query. In order to produce the default view, it then tags the result of the function invocation using the name of the corresponding table.

We will now walk through an example to show how the default view is produced for a single table. First all rows are retrieved from the relational catalog table SYSCAT.COLUMNS (we use the catalog names in the IBM DB2 database system for illustration purposes; the default XML view can also be defined on other relational database system catalogs). Each row of this table represents a unique column in the relational database, and includes the name of the column's table as well as the name of the column itself. Restricting our attention to the columns of the resistor table, this will produce the pairs (resistor, sno), (resistor, ohms), and (resistor, cost). The column names are then tagged and grouped on the table name (boxes 9, 10, 11) to produce the following query:

For $row in tablerow(resistor)

Return <row><sno>$row/sno</sno><ohms>$row/ohms</ohms><cost>$row/cost</cost></row>

Here, tablerow is a new XQuery construct to bind directly over the rows of the specified relational table and not its default XML view. This query is then executed and tagged to produce the default view corresponding to the resistor table (box 12).

By representing the default view in the internal representation (XQGM), we have essentially captured the relationship between meta-data (rows in SYSCAT.COLUMNS) and data (results of invoking ExecXQuery) within our query-processing framework. Thus, by replacing references to the default view with the internal representation of the default view, the interaction between data and meta-data in the query can be explicitly captured and optimized.

Figure 6:
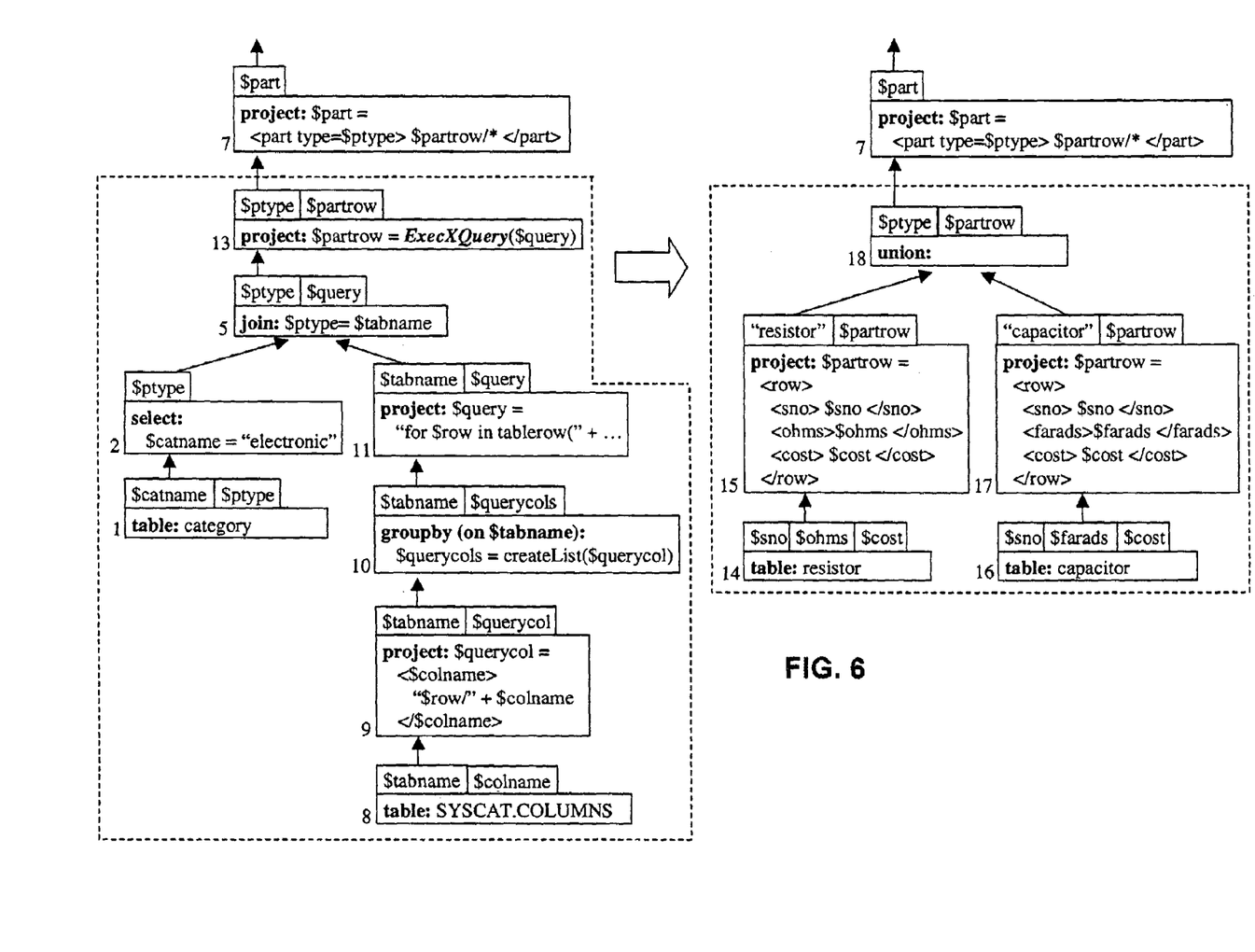
FIG. 6 is a diagram of an XML Query Graph Model, according to an embodiment of the present invention.

Referring now to FIG. 6, a diagram of an XML Query Graph Model is shown, according to an embodiment of the present invention. The meta-data dependent reference to the default view in FIG. 5 can be replaced with the XQGM of the default view to produce the resulting XQGM in FIG. 6. This grafting also makes it possible to perform an important optimization. The meta-data dependent join on the table name has been pushed to below the invocation of the ExecXQuery function. As in view composition, this is done after removing intermediate XML construction. By pushing down the join, we are essentially limiting the scope of the ExecXQuery function to exactly the tables the query actually refers to, i.e., the resistor and capacitor tables. Although not shown in this example, other optimizations are also possible, such as pushing down predicates on column names. The challenge now is to implement the higher-order function ExecXQuery.

Implementing ExecXQuery

To understand how ExecXQuery is implemented, we can draw an analogy between an invocation of ExecXQuery and how views are handled in SQL. Just as ExecXQuery logically produces the result of executing its input query, a reference to a view in SQL logically produces the result of executing the query used to define the view. Thus, invocations of ExecXQuery can be treated just like view references are treated in SQL. That is, just like references to a SQL view are replaced by the query used to define view at query compilation time, invocations of ExecXQuery can also be replaced by (the XQGM of) its input query. The main advantage of grafting the XQGM of the query, rather than executing the query directly, is the same as in the case of SQL view composition: intermediate results do not have to be materialized.

However, one issue has to be addressed before implementing ExecXQuery in the above-described manner. Unlike the query used to define a SQL view, the query passed as input to ExecXQuery is data-dependent. In our example, we need to determine the table names corresponding to electronic part types. Thus a query has to be first issued to determine the input query to ExecXQuery. The query to be issued, however, is precisely the sub-query represented as XQGM below the invocation of ExecXQuery (left side of FIG. 6).

The key observation now is that the XQGM for the sub-query is just like the XQGM for a regular query, i.e., it does not-have any higher-order operators. Therefore, we can recursively invoke the query-processor to evaluate this query. The query processor can thus perform optimizations such as pushing computation down to the relational engine for this sub-query.

Figure 7:
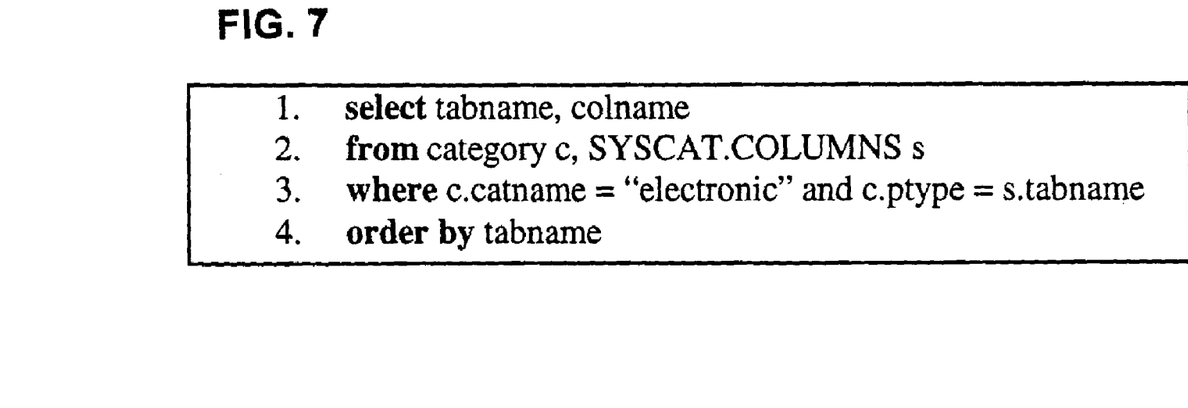
FIG. 7 is a diagram of an SQL query over relational catalog tables, according to an embodiment of the present invention.

Referring now to FIG. 7, a diagram of an SQL query over relational catalog tables is shown, according to an embodiment of the present invention. Specifically, FIG. 7 shows the SQL generated during the evaluation of the sub-query. As can be seen, it joins the category table with the relational catalog table to get the table and column information for all "electronic" part tables (resistor and capacitor in our example). The default view queries for these tables are then generated, parsed and grafted in place of the invocation of ExecXQuery, as shown in the right side of FIG. 6.

It should be noted that one of the key reasons an XML query processor can support meta-data queries in the manner described is that relational systems allow catalog tables (SYSCAT.COLUMNS) to be queried just like other relational tables. This enables an XML query processor to push down computation to the relational engine, even when the query is over relational catalog tables. Note, however, that just because relational database systems allow queries over their catalog tables, this does not imply that they support seamless querying across relational data and meta-data. Relational systems cannot use meta-data to construct and execute a new query "on the fly", as is done in the proposed technique using ExecXQuery. Once ExecXQuery is eliminated, the resulting XQGM does not have any higher order operators (right side of FIG. 6). Hence, it can be processed like a regular query.

Figure 8:
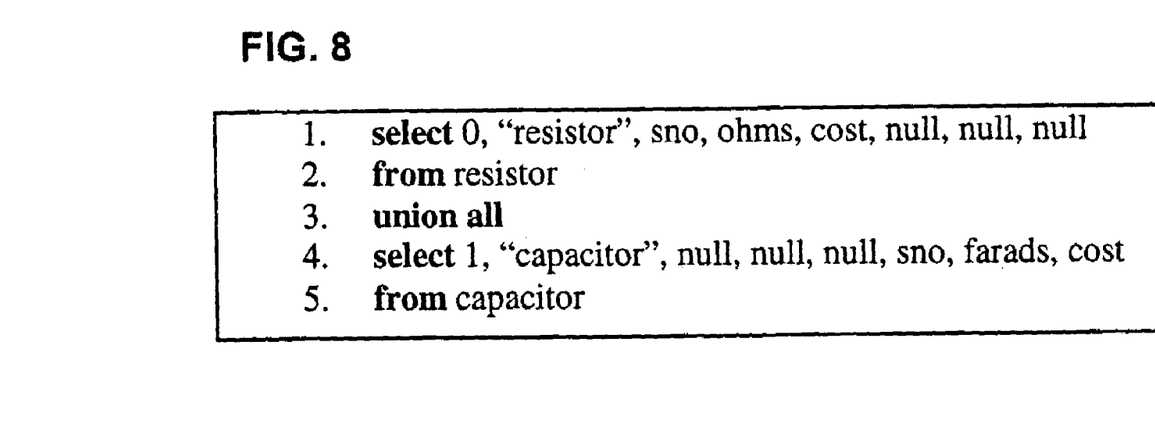
FIG. 8 is a diagram of a final SQL query, according to an embodiment of the present invention.

Referring now to FIG. 8, a diagram of a final SQL query is shown, according to an embodiment of the present invention. The final SQL query generated for our example produces one row for each resistor and capacitor. These rows are unioned together and a type field (first column) is used to distinguish resistors from capacitors. The part type information is also present (second column). This enables tagger module to construct the output XML in a single pass over the SQL result.

Method for Meta-Data Query Processing

We now present our method for meta-data query processing, based on the discussion above. The input is an XML query over the default XML view. The output is an XML document result.

1) Parse the XML query into an internal representation such as XQGM (see left side of FIG. 5).
2) Replace all non-meta-data references to the default XML view by direct references to tables.
3) Replace all meta-data references to the default XML view with a reference to the internal representation of the default XML view over the relational catalog tables. The internal representation will include the higher-order operator ExecXQuery (see right side of FIG. 5).
4) Perform optimization on the internal representation of the query. Optimizations include pushing down predicates and joins past ExecXQuery to the relational catalog tables (see left side of FIG. 6).
5) Eliminate ExecXQuery. Recursively invoke the query processor on the input to ExecXQuery. This will effectively execute the internal representation below ExecXQuery and produce one or more query strings, with each string corresponding to a query that will construct the default XML view of a given relational table. Parse and convert each of these input query strings to their internal representation, union them together, and graft on the result in place of ExecXQuery (see right side of FIG. 6).
6) After ExecXQuery references have been eliminated, the resulting internal representation is processed like a regular XML query without any meta-data references. The XML result is returned to the user.

Note that in the general case, there could multiple ExecXQuery operators appearing in the query's internal representation. These can be eliminated by repeating step 5) on the internal representation of the query in a bottom-up manner.

A general purpose computer is programmed according to the inventive steps herein. The invention can also be embodied as an article of manufacture—a machine component—that is used by a digital processing apparatus to execute the present logic. This invention is realized in a critical machine component that causes a digital processing apparatus to perform the inventive method steps herein. The invention may be embodied by a computer program that is executed by a processor within a computer as a series of computer-executable instructions. These instructions may reside, for example, in RAM of a computer or on a hard drive or optical drive of the computer, or the instructions may be stored on a DASD array, magnetic tape, electronic read-only memory, or other appropriate data storage device.

While the particular METHOD FOR PROCESSING XML QUERIES OVER RELATIONAL DATA AND META-DATA USING A RELATIONAL DATABASE SYSTEM as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for." Accordingly, the described embodiment is to be considered merely exemplary and the invention is not to be limited except as specified in the attached claims.

We claim:

1. A method for processing XML queries over relational data and meta-data using a relational database system, comprising:
    parsing an input XML query over a default XML view into an internal representation of said query;
    presenting all non-meta-data references to said default XML view;
    identifying all meta-data references to said default XML view;
    substituting each of said non-meta-data references with direct references to relational database tables;
    replacing each of said meta-data references with a new reference to the internal representation of the default view over relational catalog tables, said new references including a higher-order operator ExecXQuery;
    optimizing said internal representation of said query;
    eliminating each ExecXQuery instance by recursively invoking said query processing on the inputs to ExecQuery begin executing the internal representation below ExecXQuery to convert said meta-data references to non-meta-data references;
    repeating said substituting for all former meta-data references; and
    returning XML query results.

2. The method of claim 1, wherein said internal representation is in XML Query Graph Model format.

3. The method of claim 1, wherein said internal representation captures query semantics.

4. The method of claim 1, wherein said identifying includes:
    binding a first contruct to all "row" elements nested under the category "table" element in the default XML view;
    selecting only those first construct elements that correspond to a desired category to determine the types that belong to the desired category;
    binding a second construct to all the "table" elements in the default XML view that correspond to said desired types by
        a) getting all said table elements, then;
        b) selecting those table elements having the same tag name as one of said desired types;
    determining all desired elements in said second construct; and
    returning said meta-data references.

5. The method of claim 1, wherein said identifying includes:
    determining desired types by
        a) performing a selection on the category table;
        b) joining the results of said selection with the tag names of "table" elements in said default XML view;
    unnesting desired "row" elements from their "table" element; and
    using the unnested elements to produce returned results.

6. The method of claim 1, wherein said operator ExecXQuery corresponds to a sub-query for a particular table in said relational database that, if executed, materializes the "row" elements in the default view for said particular table to produce the result of executing said sub-query.

7. The method of claim 1, wherein said optimizing includes pushing down predicates and joins past ExecX-Query to said relational catalog tables.

8. The method of claim 1, wherein said executing includes:
producing one or more query strings, each said query string corresponding to a new query that will reconstruct the default XML view of a particular relational table;
converting each of said query strings to a corresponding internal representation;
unioning each of said query strings together; and
grafting the results of said unioning in place of said corresponding ExecXQuery instance.

9. The method of claim 1, wherein said eliminating is repeated in a bottom-up manner.

10. A computer program product for processing XML queries over relational data and meta-data using a relational database system, comprising a computer-readable medium tangibly embodying computer-executable code thereon, said code including:
a first code for parsing an input XML query over a default XML view into an internal representation of said query;
a second code for presenting all non-meta-data references to said default XML view;
a third code for identifying all meta-data references to said default XML view;
a fourth code for substituting each of said non-meta-data references with direct references to relational database tables;
a fifth code for replacing each of said meta-data references with a new reference to the internal representation of the default view over relational catalog tables, said new references including a higher-order operator ExecXQuery;
a sixth code for optimizing said internal representation of said query;
a seventh code for eliminating each ExecXQuery instance by recursively invoking said query processing on the inputs to ExecQuery begin executing the internal representation below ExecXQuery to convert said meta-data references to non-meta-data references;
an eighth code for repeating said substituting for all former meta-data references; and
a ninth code for returning XML query results.

11. The product of claim 10, wherein said internal representation is in XML Query Graph Model format.

12. The product of claim 10, wherein said internal representation captures query semantics.

13. The product of claim 10, wherein said identifying includes:
binding a first contruct to all "row" elements nested under the category "table" element in the default XML view;
selecting only those first construct elements that correspond to a desired category to determine the types that belong to the desired category;
binding a second construct to all the "table" elements in the default XML view that correspond to said desired types by
a) getting all said table elements, then;
b) selecting those table elements having the same tag name as one of said desired types;
determining all desired elements in said second construct; and
returning said meta-data references.

14. The product of claim 10, wherein said identifying includes:
determining desired types by
a) performing a selection on the category table;
b) joining the results of said selection with the tag names of "table" elements in said default XML view;
unnesting desired "row" elements from their "table" element; and
using the unnested elements to produce returned results.

15. The product of claim 10, wherein said operator ExecXQuery corresponds to a sub-query for a particular table in said relational database that, if executed, materializes the "row" elements in the default view for said particular table to produce the result of executing said sub-query.

16. The product of claim 10, wherein said optimizing includes pushing down predicates and joins past ExecXQuery to said relational catalog tables.

17. The method of claim 10, wherein said executing includes:
producing one or more query strings, each said query string corresponding to a new query that will reconstruct the default XML view of a particular relational table;
converting each of said query strings to a corresponding internal representation;
unioning each of said query strings together; and
grafting the results of said unioning in place of said corresponding ExecXQuery instance.

18. The method of claim 10, wherein said eliminating is repeated in a bottom-up manner.

19. A system for processing XML queries over relational data and meta-data using a relational database system, comprising:
means for parsing an input XML query over a default XML view into an internal representation of said query;
means for presenting all non-meta-data references to said default XML view;
means for identifying all meta-data references to said default XML view;
means for substituting each of said non-meta-data references with direct references to relational database tables;
means for replacing each of said meta-data references with a new reference to the internal representation of the default view over relational catalog tables, said new references including a higher-order operator ExecXQuery;
means for optimizing said internal representation of said query;
means for eliminating each ExecXQuery instance by recursively invoking said query processing on the inputs to ExecQuery begin executing the internal representation below ExecXQuery to convert said meta-data references to non-meta-data references;
means for repeating said substituting for all former meta-data references; and
means for returning XML query results.

* * * * *